Nov. 8, 1927.                    1,648,571
G. W. ZISKA
RESERVE LIGHT SYSTEM
Filed May 31, 1924
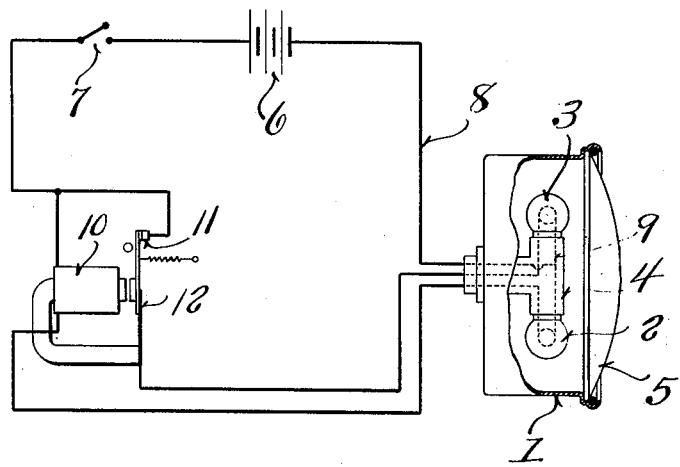
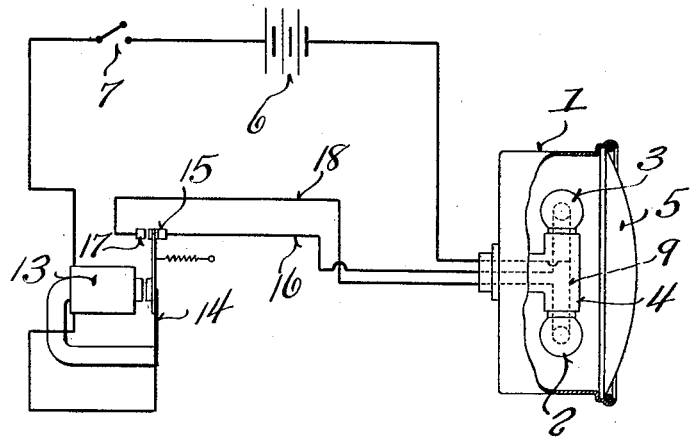
Witness:
R. E. Weber
Inventor:
George W. Ziska
Attorneys Patented Nov. 8, 1927.

1,648,571

UNITED STATES PATENT OFFICE.

GEORGE W. ZISKA, OF CHICAGO, ILLINOIS.

RESERVE-LIGHT SYSTEM.

Application filed May 31, 1924. Serial No. 717,193.

This invention relates to reserve light systems.

It is highly desirable in a number of instances to insure the continuous illumination of a signal lamp, such for instance as a danger signal, exit signal, the tail light of an automobile and other numerous cases. These lights are not always accessible and further, the immediate attention of an operator is not always available. The burning out of one of these lights, therefore, occasions considerable trouble and delay. For instance, in the tail light of an automobile it frequently happens that this light burns out and the driver is penalized although he has had no warning of the extinction of the light.

This invention is designed to overcome the above noted defects, and objects of such invention are to provide a reserve light system in which a main light is normally illuminated but when, for any reason, the circuit of the main light is opened, a reserve light is immediately turned on and the signal thus persists without interruption.

Further objects are to provide a simple automatic system for a reserve light which is certain in its operation, which requires no attention, and which can be easily installed.

Embodiments of the invention are shown in the accompanying drawing which, for the sake of illustration, have been shown as applying the system to the tail light of an automobile although, obviously, other uses are intended.

Referring to the drawings:—

Figure 1 is a diagrammatic view of one form of the invention.

Figure 2 is a view showing a further form.

Referring to Figure 1, it will be seen that a tail light casing 1 is provided with a main lamp 2 and an auxiliary or reserve lamp 3. If desired, these lamps may be carried in a double socket 4 secured to the casing and either lamp is adapted to furnish the necessary illumination for the translucent colored glass 5 of the tail light.

The system includes a source of electrical energy such for instance as the battery 6 and the control switch 7 by means of which the tail light is turned on and off. One side of the battery is connected by means of conductor 8 with a common terminal 9 of the lights. The other side of the battery, after passing through the control switch 7, is connected through the solenoid 10 of an electromagnetic device with the main light 2. A second circuit extends from the control switch 7 through a stationary contact 11 through an armature 12 to the reserve light 3. This circuit is closed when the winding 10 is deenergized.

In operation, the driver closes the switch 7 and current passes through the winding 10 of the magnet through the main light 2 and returns to the battery 6. The magnet draws the armature 12 inwardly thus interrupting the circuit through the reserve light 3. If for any reason the circuit, including the main light 2, should become interrupted, as for example when the lamp 2 burns out, the magnet immediately releases the armature and the auxiliary circuit through the contact 11 and the armature 12 and through the reserve light 3 is immediately established, and the reserve lamp is energized.

At suitable intervals the driver may inspect the tail light and may replace a burned out main light with a fresh light, if desired, or he may place the reserve light in the main light socket and place a new lamp in the reserve light socket.

In the form shown in Figure 2, the battery has one terminal connected with the common terminal 9 of the main and reserved lights 2 and 3. The other side of the battery is connected through switch 7 to one side of the winding 13 of the magnet. The other side of the magnet is connected with the armature 14 and when the magnet is deenergized is connected through such armature to the stationary outer contact 15. From this point a conductor 16 leads to the auxiliary light 3. An inner stationary contact 17 is provided and is connected by means of conductor 18 with the main light 2.

In operation, when the switch 7 is first closed, current flows through the magnet winding, through the armature to the contact 15, through the auxiliary light 3, and back to the battery. The armature 14 is immediately drawn inwardly and engages the stationary contact 17. This connects with the main light 2 and permits energization of such light. When, however, the main light 2 burns out or for any reason its circuit is interrupted, the magnet is momentarily deenergized and the armature moves outwardly into engagement with the outer contact 15 thus establishing a circuit through the auxiliary light 3. However, this circuit is periodically interrupted by the trembling or vibrating action of the armature in the well known manner and consequently such light is caused to flicker.

This last form of invention thus gives a signal independently of the lighting of a new lamp in the tail light and causes a flickering of such light thus attracting the attention of the operator.

It is to be noted that by the provision of the contacts 15 and 17, and with the armature in contact with the contact 15 when the device is de-energized, that a check on the integrity of the reserve light is always had whenever the manually controlled switch 7 is operated. For example, if the reserve light is burned out, the electromagnetic device will not close, as there is no current passing in the circuit including the armature and the contact 15. There is, therefore, an automatic check on the reserve light each time the manually operable switch 7 is closed.

It is to be noted that the system may most easily be applied to existing types of tail light systems and that a very simple change is required to adapt a standard tail light to this system.

It will further be seen that the system is extremely simple and that relatively inexpensive devices are employed for maintaining the illumination of a signal or light at all times.

It is to be understood that the specific application of this invention as illustrated, and described to tail lights for automobiles has been chosen not with the idea of limiting the invention, but for the purpose of having a simple, specific disclosure of one application of the invention.

Therefore, although the invention has been described in considerable detail, it is to be understood that the invention may be variously embodied and is, therefore, to be limited only as claimed.

I claim:

A reserve light system comprising a casing having a main light and an auxiliary light therein, an electromagnetic device having a movable armature, a pair of stationary contacts mounted on opposite sides of said armature, said contacts being connected by conductors to each of said lights, a solenoid forming a portion of said electromagnetic device and having one side connected to said armature and the other side connected by means of a conductor to a manually controlled switch and a source of electrical energy, said source of electrical energy being connected to each of said lights.

In testimony that I claim the foregoing I have hereunto set my hand at Chicago, in the county of Cook and State of Illinois.

GEORGE W. ZISKA.